June 27, 1933.  G. MEERBECK  1,915,743

INSTALLATION OF UNDERGROUND ELECTRIC CABLES FOR POWER TRANSMISSION

Filed Nov. 19, 1931

G. Meerbeck
INVENTOR

By: Marks & Clerk

Patented June 27, 1933

1,915,743

UNITED STATES PATENT OFFICE

GOTTFRIED MEERBECK, OF COLOGNE-MULHEIM, GERMANY, ASSIGNOR TO NAAMLOOZE VENNOOTSCHAP HANDELMAATSCHAPPIJ CABLON (CABLON CORPORATION), OF THE HAGUE, NETHERLANDS

INSTALLATION OF UNDERGROUND ELECTRIC CABLES FOR POWER TRANSMISSION

Application filed November 19, 1931, Serial No. 576,190, and in Germany November 25, 1930.

It has previously been proposed to install electric high tension insulated or bare cables in pressure-resisting, gastight, steel pipes containing a pressure medium. For the purpose of obtaining a reliable and durable gastight connection, the individual pipes are generally joined together in the usual way by welding and the cable is then pulled through. Difficulties are encountered when the lengths of pipes through which the electric cables have already been pulled through have to be connected together, or when gastight connecting sleeves have to be provided over completed cable joints, since when the steel tubes and the flanges of the connecting sleeve have to be welded the cable which lies in the interior of the pipe at a very small distance from the welding points would be destroyed by the high welding temperature.

The present invention has for its object to provide a jointing arrangement for the pressure pipes of cable installations in which the difficulties above referred to will be avoided and which will also allow a completed steel pipe joint to be cut open, whenever any cable repairs are necessary, and to re-establish it by welding, without endangering the cable which lies in the interior of the pipes or connecting sleeves.

Figure 1:
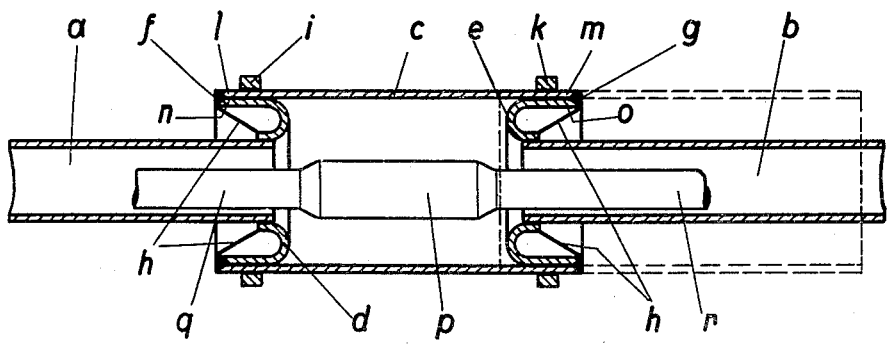
Figure 2:
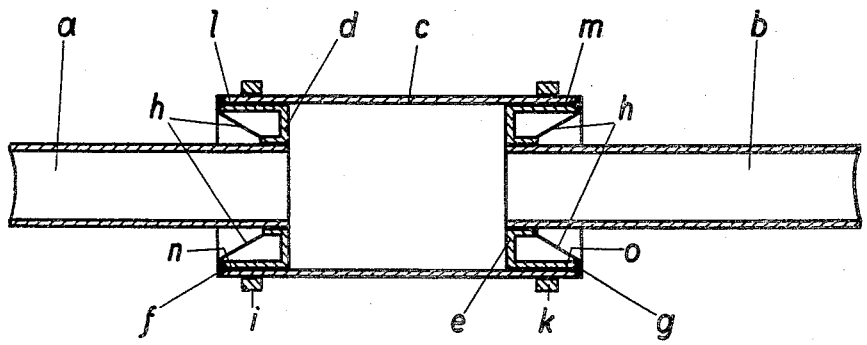

Figures 1 and 2 of the accompanying drawing illustrate in longitudinal section joints for pressure pipe cable installations according to the invention, similar parts being indicated by the same reference letters.

As the cable joint itself is in no way different from the joints known in practice, it has been merely indicated at $p$ in Figure 1 and left out altogether in Figure 2.

In Figure 1 $q$ and $r$ are the two cable ends connected together by the cable joint $p$. This joint must, like the cable itself, be provided with a sufficiently impervious and flexible covering serving as a membrane for the pressure, e. g. a lead covering of suitable thickness, by means of which the pressure of the medium in the interior of the joint box is transmitted to the interior of the cable joint. $a$ and $b$ are the two ends of the pressure pipe which are intended to be connected together by an appropriate construction, which will be resistant to pressure. For this purpose the pipe ends are provided with ferrules $d$ and $e$ having inner flanges fixed to the pipe ends $a$ and $b$ and having elongated turned annular flanges $n$ and $o$. It is important that the curved parts $d$ and $e$ shall be bent in the direction shown in the drawing, that is to say they should extend away from the joint and that, in addition thereto, the flanges $n$ and $o$ which are a continuation of the curved parts, shall be of sufficient length.

The said curved ferrules $d$ and $e$ with the annular flanges $n$ and $o$ which are turned back may be obtained by pressing and be welded on to the pipe ends $a$ and $b$ before the pipes are delivered.

A piece of pipe $c$ of sufficient length is drawn as connecting sleeve over the flanges $n$ and $o$ and is joined to the flanges tightly and securely by annular welding at $f$ and $g$. In order to strengthen the structure, use may also be made of shrinking rings $i$ and $k$, which are drawn over the connecting sleeve $c$ and flanges $n$ and $o$ respectively. The ferrules may also be provided with narrow ribs $h$ for strengthening purposes.

Before the assembling, the sleeve is pushed over one of the pipe ends. After the cable has been installed, the sleeve $c$ is pushed into the right position, the welding is effected at $f$ and $g$ and, if desired, the shrinking rings $i$ and $k$ are drawn over, whereby the joint is completed. It is to be understood that pipe joints as hereinbefore described may be provided for the purpose of cable repairs also in such places of the pipe line where there are no cable joints.

The form of construction of pipe joints hereinbefore described has many advantages; thus, for instance, if it is desired to effect any repair of the cable, it is easy to open the sleeve by simply cutting away the welding seams $f$ and $g$. It is just as easy to re-weld the sleeve when the repair is terminated without using any new parts. There is no difficulty in making the flanges $n$ and $o$ of the ferrules of such a length that four, five or more repairs can be effected without using any new parts for the pipe joint. In such case, the new welds of the flanges with the sleeve $c$ come to lie nearer and nearer to the middle of the sleeve, the first one for instance at approximately the place indicated by the reference letters *l* and *m* respectively. The cable joint is made accessible by removing the welding seams *f* and *g* by cutting, whereupon the sleeve *c* is pushed aside, as shown in dotted lines in Fig. 1; after the repair has been effected, the pipe *c* is again pushed over the flanges *n* and *o* and is re-welded thereto.

The use of turned-back ferrules with annular flanges has the further advantage that the welds are distant from the pipe and the cable therein; therefore the heating of the cable during welding is further reduced. Moreover, by circulating cold air or water or by inserting moist material in the hollow space of each ferrule, the transmission of heat from the welds to the interior of the pipe can easily be practically completely avoided.

It is to be understood that the shape of the turned-back ferrules may be different from that shown in Fig. 1. For instance, instead of the curvature it may be angular, such as shown in Fig. 2 as long as the direction of the turned-back flanges from the jointing point is maintained as in Fig. 1.

What I claim is:—

In an underground installation for the transmission of electric power comprising a gas-tight pressure pipe line constituted by a number of pipes and an electric cable and pressure medium within the said pipe line, a pipe joint for connecting the ends of the pipes comprising ferrules at the pipe ends and having elongated turned-back annular flanges, and a connecting sleeve fitting on said flanges and welded thereto, at the end edges whereby said welded edges of the sleeve and flanges may be repeatedly cut off and re-welded to permit of access to the cable joints.

In testimony whereof I have signed my name to this specification.

GOTTFRIED MEERBECK.